Nov. 25, 1969 — K. D. HARRIS — 3,480,309
CLAMP
Filed July 19, 1967
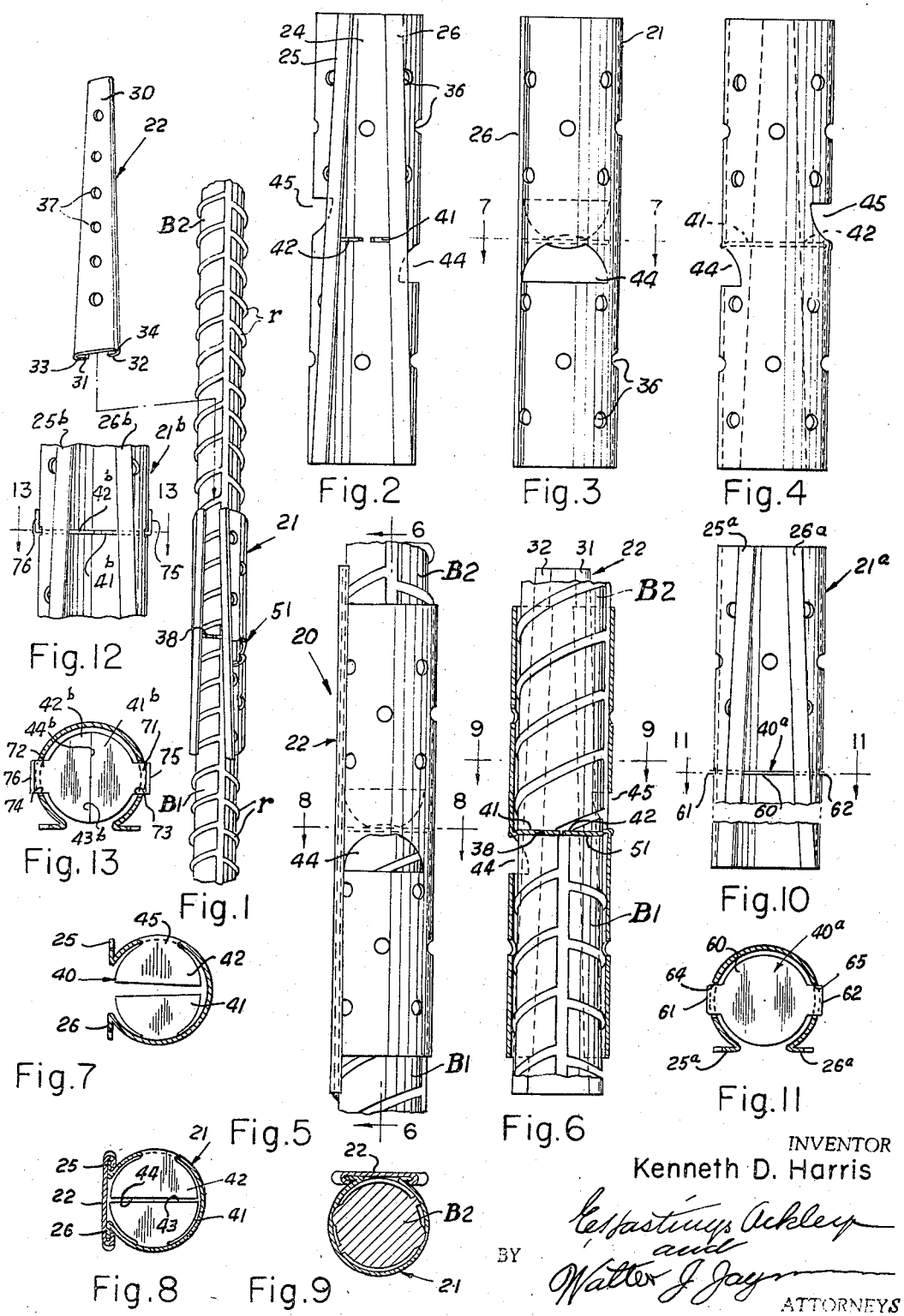
INVENTOR
Kenneth D. Harris
ATTORNEYS ical passage into whose opposite ends the elongate members are telescopical, the tubular member having a longitudinal opening or slit to facilitate its radial contraction into constricting gripping engagement with the end portions of the bars positioned therein, and support means in the passage of the tubular member intermediate its ends and connected to the tubular member against longitudinal movement in the passage, the support means limiting the telescopical movement of the tubular member over an elongate member whereby the tubular member may be supported in vertical position in proper relation to, and on one end of, an elongate member while the other elongate member is being inserted therein and during the contraction of the member into constricting gripping engagement with the end portions of the elongate members telescoped in opposite end portions thereof.

United States Patent Office

3,480,309
Patented Nov. 25, 1969

3,480,309
CLAMP
Kenneth D. Harris, 108 Windward,
Euless, Tex. 76039
Filed July 19, 1967, Ser. No. 654,522
Int. Cl. F16b 7/00; F16d 1/00
U.S. Cl. 287—110                    2 Claims

ABSTRACT OF THE DISCLOSURE

A clamp for securing adjacent ends of longitudinally aligned reinforcing bars of concrete structures which includes a tubular longitudinally split sleeve and a contracting member for pulling the ends of the tubular sleeve toward one another to contract the sleeve radially into firm gripping engagement with adjacent end portions of the reinforcing bars which are telescoped into opposite ends of the sleeve, the sleeve having internal support means intermediate its ends for holding the sleeve in a predetermined position on one of the reinforcing bars.

Summary of the invention

Briefly stated, the invention relates to a clamp for securing to one another a pair of vertically extending members, such as steel reinforcing bars, which has a radially contractible tubular member having a longitudinal passage into whose opposite ends the elongate members are telescopical, the tubular member having a longitudinal opening or slit to facilitate its radial contraction into constricting gripping engagement with the end portions of the bars positioned therein, and support means in the passage of the tubular member intermediate its ends and connected to the tubular member against longitudinal movement in the passage, the support means limiting the telescopical movement of the tubular member over an elongate member whereby the tubular member may be supported in vertical position in proper relation to, and on one end of, an elongate member while the other elongate member is being inserted therein and during the contraction of the member into constricting gripping engagement with the end portions of the elongate members telescoped in opposite end portions thereof.

This invention relates to clamps and more particularly to clamps for securing elongate members to one another in axially aligned relationship.

An object of this invention is to provide a new and improved clamp for securing adjacent end portions of two elongate members, such as the reinforcing rods of concrete structures, which includes a longitudinally split sleeve into whose opposite end portions are telescopical the adjacent end portions of a pair of elongate members of the reinforcing bars, and a contractor for drawing the longitudinal ends of the sleeve toward one another to contract the sleeve throughout its length into constricting gripping engagement with the portions of the bars telescoped in opposite ends of the sleeve.

Another object is to provdie a clamp whose sleeve is provided with internal support engageable with the end surface of one of the reinforcing bars to position and hold the sleeve in predetermined position relative to the bars during the insertion of the other bar into the sleeve and during the driving of the contractor or wedge portion of the sleeve.

Still another object is to provide a clamp of the type described wherein the support means comprise a pair of end tabs struck inwardly from diametrically opposite longitudinally spaced locations of the sleeve intermediate its ends to lie in a substantially common plane which extends perpendicular to the longitudinal axis of the sleeve.

A further object is to provide a clamp of the type described wherein the support means comprises a planar member extending the sleeve and having opposite end tabs extending through aligned slots in the sleeve to permit contraction of the sleeve about reinforcing bars telescoped into opposite ends of the sleeve.

A still further object is to provide a clamp of the type described which will hold a pair of reinforcing rods in vertical alignment and transmit compression forces from the top bar to the top planar surface of the bottom bar.

An important object of the invention is to provide a clamp whose sleeve does not have to be supported by external means after it has been telescoped over the top end of the lower bar thus permitting the operator to use both hands to manipulate the contractor and the top bar.

Still another object is to provide a clamp wherein support means ensures that adjacent end portions of the bars of substantially equal lengths are telescoped into opposite ends of the sleeve.

Additional objects and advantages of the invention will be readily apparent from the reading of the following description of a device constructed in accordance with the invention, and reference to the accompanying drawings thereof, wherein:

FIGURE 1 is an exploded perspective view of the clamp embodying the invention showing the sleeve disposed in position to clamp the adjacent ends of two reinforcing bars to one another;

FIGURE 2 is a front view of the sleeve of the clamp;

FIGURE 3 is a side view of the sleeve;

FIGURE 4 is a rear view of the clamp;

FIGURE 5 is a side view showing the clamp contracted about and rigidly securing adjacent end portions of two reinforcing bars to one another;

FIGURE 6 is a vertical partly sectional view taken on line 6—6 of FIGURE 5;

FIGURE 7 is a sectional view taken on line 7—7 of FIGURE 3;

FIGURE 8 is a sectional view taken on line 8—8 of FIGURE 5;

FIGURE 9 is a sectional view taken on line 9—9 of FIGURE 6;

FIGURE 10 is a front view of another modified form of the clamp embodying the invention;

FIGURE 11 is a sectional view taken on line 11—11 of FIGURE 10;

FIGURE 12 is a fragmental front view of another clamp including the invention; and, FIGURE 13 is a sectional view taken on line 13—13 of FIGURE 12.

Referring now particularly to FIGURES 1 through 9 of the drawings, the clamp 20 embodying the invention includes a tubular sleeve 21 which is formed of steel or other suitable somewhat resilient or flexible substance and a contractor 22 for the sleeve. The sleeve 21 is split longitudinally to provide an opening 24 extending the full length of the sleeve. The marginal edge portions of the sleeve are turned outwardly in opposite directions to provide longitudinally extending wedge flanges 25 and 26 on opposite sides of the longitudinal opening. The width of the opening increases progressively downwardly throughout its length so that the wedge flanges 25 and 26 diverge downwardly.

The sleeve contractor 22 comprises a flat plate 30 having diverging side edge portions which are bent inwardly toward one another to form hook flanges 31 and 32 which define grooves 33 and 34, respectively, in which are receivable the wedge flanges 25 and 26, respectively, of the sleeve.

It will be apparent, due to the downward divergence of the wedge flanges 25 and 26 and of the hook flanges 31 and 32 of the contracting member 30, which with the flat plate provide the inwardly opening grooves 33 and 34, that as the lower end of the contractor is moved downwardly relative to the sleeve with the flanges 25 and 26 being received in the grooves 33 and 34 respectively, the sleeve is contracted radially to firmly grip and engage the external ribs and of the adjacent end portions of the reinforcing bars B1 and B2 which are telescoped into the lower and upper end portions of the sleeve 21. The sleeve and the contractor are provided with a plurality of spaced apertures 36 and 37, respectively, to permit concrete to flow into the sleeve and between the sleeve and the reinforcing bars during the construction of a structural member, such as column, which is reinforced by vertical reinforcing bars connected by the clamps at their adjacent ends. The structure of the contractor and the sleeve thus far described is similar to the structure of similar clamps disclosed in the patents to F. D. Reiland, Nos. 3,245,189 and 3,245,190.

The sleeve 21 of clamp 20 employing the invention differs from that of the clamps disclosed in the patents to Reiland in having a support means 40 for engaging the planar top end surface 38 of the lower reinforcing rod B1 to properly position the sleeve on the lower rod so that approximately half its length is telescoped over the lower bar and to hold the sleeve against displacement during the telescoping of the top bar B2 into the upper portion of the sleeve and during the driving of the contractor 30 downwardly relative to the sleeve to contract the sleeve into firm clamping or gripping engagement with the ribs of the reinforcing rods. The support means 40 of the sleeve includes a pair of substantially semi-circular tabs 41 and 42 which are struck inwardly by a suitable die from diametrically opposed and longitudinally spaced locations along the sleeve. The tab 41 is struck upwardly from a location at or slightly below the central horizontal plane of the sleeve which extends perpendicular to its longitudinal axis and leaves an inspection opening 44 disposed below the central place of the sleeve while the tab 42 is struck downwardly from a location substantially at or slightly above the central plane of the sleeve and forms an inspection opening 45.

It will be apparent that the tabs are integral with the sleeve and when the sleeve is in its expanded position as illustrated in FIGURES 1, 2, 3, 4, and 7, the inner edges 43 and 44 of the tabs 41 and 42, respectively are spaced from one another and will permit radial contraction of the sleeve even though the two tabs lie in a common horizontal plane which is perpendicular to the longitudinal central axis of the sleeve. When the sleeve is in contracted position, the edges 43 and 44 are closely adjacent one another, the spacing thereof in FIGURE 8 being exaggerated for clarity of illustration. The support means 40, i.e., the tabs 41 and 42, are located substantially at the middle of the length of the sleeve so that the sleeve will have equal longitudinal portions thereof engageable with the adjacent end portions of equal lengths of the upper and lower bars which are telescoped into opposite ends of the sleeve and secured together by the clamp.

When the clamp 20 is to be used to secure the adjacent end portions of two vertical bars B1 and B2 together to hold them in axial alignment, the lower portion of the sleeve 21 is telescoped over the upper end portion of the lower bar B1 until the bottom surfaces of its tabs 41 and 42 rest on the top surface 38 of the lower bar. The sleeve will now be held on the lower bar by gravity and cannot be dislodged laterally off the bar because the width of its longtiudinal opening 24 is smaller than the diameter of the bar. The workman therefore does not have to use any other means to hold the sleeve on the lower bar during subsequent operations as is the case with conventional clamp sleeves which are not provided with such internal support means, it being the practice to secure a pipe wrench to the lower bar to position properly the conventional clamp sleeve on the lower bar and hold it against downward movement. The lower end of the top bar B2 is then telescoped into the upper end of the sleeve until its bottom flat surface 51, which extends perpendicularly to its longitudinal axis, rests on the top surfaces of the tabs 41 and 42. The lower end of the contractor 30 is then moved into alignment with the wedge flanges 25 and 26 of the sleeves 21 and is then moved downwardly, the wedge flanges 25 and 26 entering into the grooves 33 and 34. The wedge member is driven downwardly on the sleeve by hammer blows applied to its upper end and radially contracts the sleeve throughout its length during this downward movement. During the driving of the contracting member 30 over the wedge flanges 25 and 26, there is no necessity to hold the sleeve against downward movement since the tabs prevent downward movement of the sleeve and the tabs are held against outward and inward movement on the sleeve due to the engagement therewith of the bottom end surface of the upper bar. The bars are then held tightly in vertical longitudinal alignment and the bars and the stop members form a substantially vertical solid column. The constricting clamping action of the sleeve on the end portions of the bars telescoped therein helps move the upper bar into axial alignment with the lower bar and, due to its flexibility or resilience of the substance of which it is formed, conforms to the configuration of the bar and thereby compensates for variations in the diameters and the external contours of the bars.

It will be apparent that the planar tabs 41 and 42 provide relatively large areas of contact with the planar end surfaces 38 and 51 of the bars B1 and B2, respectively, and the bars and tabs thus constitute a solid column for the transmittal of vertical compressional forces.

It will be apparent that the operator need not take any pains to position the sleeve on the two bars or to support the sleeve which results in great saving of time and labor especially in relatively inaccessible locations since the sleeve is properly positioned and supported by means of its tabs on the top end of the lower reinforcing bar while the upper bar is telescoped into the upper end portion of the sleeve and while the sleeve contractor is driven downwardly over the wedge flanges of the sleeve.

It will further be seen that the provision of the end tabs located at the central plane of the sleeve insures that end portions of equal length of the two reinforcing bars are engaged and clamped by the sleeve.

It will further be seen that since the tabs 41 and 42 are struck inwardly from diametrically opposite but longitudinally spaced locations of the sleeve, the sleeve is not weakened substantially at any longitudinal location thereof and provides a relatively great resistance to transverse shear forces to which it may be subjected during the contraction thereof about the reinforcing bars or during the pouring of the concrete in which the bars are eventually embedded.

It will also be seen that as the sleeve is radially contracted, the tabs will slide toward one another between the planar end surfaces of the two bars.

It will also be apparent that while the tabs 41 and 42 are shown as being integral with the sleeve and formed of struck in portions of the substantially cylindrical sleeve for reasons of economy and ease of manufacture, these tabs may be, if desired, separate pieces welded to opposite internal surfaces of the sleeve.

Referring now to FIGURES 10 and 11 of the drawing, the sleeve 21a being similar to the sleeve 21 of the clamp 20, its elements have been provided with the same reference numerals, to which the subscript a has been added, as the corresponding elements of the sleeve 21. The sleeve 21a differs from the sleeve 21 in that its stop means 40a comprises a disc 60 having diametrically opposed extensions or arms 61 and 62 which extend outwardly through slots 64 and 65, respectively, of the sleeve 21a. The diameter of the disc 60 is smaller than the internal diameter of the sleeve when it is in its expanded position illustrated in FIGURE 11 and also somewhat smaller than the internal diameter of the sleeve when it is in its contracted clamping position about the end portions of the bars which are telescoped into its opposite end portions to permit radial contraction of the sleeve.

It will be apparent that the support means 40a functions in the same manner as the support means 40 of the clamp 20 and that the sleeve 21a is contractible by a contractor 30 which is drivable downwardly over its wedge flanges 25a and 26a in the same means as the sleeve 21.

Referring now particularly to FIGURES 12 and 13, of the drawings, the sleeve 21b is similar to the sleeve 21 and whose elements are provided with the same reference numerals to which subscript b has been added as the corresponding elements of the sleeve 21. The tabs 41b and 42b are separate semi-circular members provided with extensions 71 and 72 which extend slidably through slots 73 and 74, respectively, of the sleeve 21b located at its central plane. The extensions 71 and 72 have up turned arms 75 and 76, respectively, which are adapted to engage the external surfaces of the sleeve above the slots to prevent dislodgement of the tabs from the sleeve. Thus the semi-circular tabs 41b and 42b function in the same manner as the tabs 41 and 42 and are of course of such dimensions as to permit radial contraction of the sleeve 21b about reinforcing bars telescoped into its opposite ends by a contractor 30 in the same manner as the sleeve 21.

It will now be seen that the sleeve of the clamp embodying the invention has support means for positioning and holding the sleeve in proper relation to the bars which are telescoped into its opposite ends so that each bar will be secured by the sleeve throughout substantially the same length as the other, and that the support means provide for direct transmission of compressional forces from the upper bar to the lower bar since they are planar in configuration and are abutted by substantial areas of the planar end surfaces of the two bars.

It will be apparent that extensions of the tabs 41a and 41b of the sleeve and 21b may be made sufficiently long that their edges 43b and 44b may actually be in contact when the sleeve is in its initial expanded condition so that the tabs do not have to slide toward one another between the end surface bars as the sleeve is contracted.

It will also be apparent that, if desired, the extensions 61 and 62 of the planar member 60 of the sleeve 21b may also be provided exteriorly of the sleeve with arms which extend parallel to the longitudinal axis and either upwardly or downwardly to hold the planar member in centered position in the sleeve when it is in its expanded position.

While the sleeves of the illustrated and described clamps have been shown as provided with a particular means for radially contracting the sleeves, it will be apparent that other means, such as the conventional circular or band clamps and the like, could be used to contract the longitudinally split sleeves. In this case the sleeves would not be provided with the wedge flanges 25 and 26.

The foregoing description of the invention is explanatory only, and changes in the details of the construction illustrated may be made by those skilled in the art, without departing from the spirit of the invention.

What is claimed and desired to be secured by Letters Patent is:

1. A clamp for securing to one another adjacent end portions of a pair of longitudinally aligned reinforcing bars having adjacent planar end surfaces, said clamp including: a radially contractible sleeve having a longitudinal passage; a pair of substantially semicircular planar tabs in said sleeve and integral with said sleeve, said tabs being located at substantially the middle of said sleeve, said tabs extending perpendicularly to the longitudinal axis of said passage in a common plane over the major portion of the cross-sectional area of said passage and having oppositely facing planar surfaces engageable with planar end surfaces of aligned reinforcing bars telescoped in opposite ends of said sleeve, said sleeve having a longitudinal opening to facilitate the radial contraction thereof, said sleeve being provided along opposite edges of the opening with outwardly turned wedge flanges which diverge longitudinally from each other to constitute wedge means; a contractor having inturned flanges for engaging substantially the entire length of said wedge flanges of said sleeve and for radially contracting said sleeve into constricting gripping engagement with adjacent end portions of reinforcing bars positionable in opposite end portions of said sleeve upon longitudinal movement of said contractor relative to said sleeve, said tabs having facing inner edge surfaces spaced from one another when said sleeve is not contracted and adjacent one another and slightly spaced from each other when said sleeve is contracted, whereby said tabs extend substantially the full cross-sectional area of said passage when said sleeve is contracted.

2. The clamp of claim 1, wherein one of said tabs comprises a portion of said sleeve displaced upwardly into said passage and the other of said tabs comprises a portion of said sleeve displaced downwardly into said passage, said diplaced portions providing inspection apertures below said one of said tabs and above said other of said tabs.

References Cited

UNITED STATES PATENTS

| | | | |
|---|---|---|---|
| 719,817 | 2/1903 | Kunze | 287—108 |
| 1,098,287 | 5/1914 | Moon | 287—108 |
| 1,527,323 | 2/1925 | Moore | 52—726 |
| 2,538,043 | 1/1951 | Roy et al. | 287—114 |
| 3,033,600 | 5/1962 | Drysdale | 287—114 |
| 3,340,667 | 9/1967 | Reiland | 52—726 |

REINALDO P. MACHADO, Primary Examiner

W. L. SHEDD, Assistant Examiner

U.S. Cl. X.R.

52—726